(12) United States Patent
Nakahira et al.

(10) Patent No.: US 6,285,566 B1
(45) Date of Patent: *Sep. 4, 2001

(54) RCC POWER SUPPLY WITH REMOTE DISABLING OF OSCILLATION FREQUENCY CONTROL

(75) Inventors: Koji Nakahira, Kyoto; Ryuji Okamura, Nagaokakyo; Ryota Tani, Otokuni-gun; Akio Nishida, Kyoto, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/234,958

(22) Filed: Jan. 21, 1999

(30) Foreign Application Priority Data

Feb. 9, 1998 (JP) .................................. 10-027037

(51) Int. Cl.[7] .................................................. H02M 3/335
(52) U.S. Cl. .............................................. 363/19; 363/97
(58) Field of Search ...................... 363/19, 21, 97

(56) References Cited

U.S. PATENT DOCUMENTS

| | | | |
|---|---|---|---|
| 4,283,759 | * | 8/1981 | Koiki ..................................... 363/19 |
| 4,758,937 | * | 7/1988 | Usui et al. ............................. 363/97 |
| 4,763,235 | * | 8/1988 | Morita ................................... 363/19 |
| 4,914,560 | | 4/1990 | Oh et al. ................................ 363/56 |
| 4,956,761 | * | 9/1990 | Higashi ................................. 363/21 |
| 4,958,268 | * | 9/1990 | Nagagata et al. ....................... 363/97 |
| 5,675,479 | * | 10/1997 | Tani et al. ............................. 363/19 |
| 5,719,755 | * | 2/1998 | Usui ...................................... 363/19 |
| 5,812,383 | * | 9/1998 | Majid et al. ........................... 363/21 |
| 5,838,556 | * | 11/1998 | Yokoyama ............................. 363/19 |
| 5,852,550 | * | 12/1998 | Majid et al. ........................... 363/21 |
| 5,978,234 | * | 11/1999 | Nagahira .............................. 363/19 |

* cited by examiner

*Primary Examiner*—Jeffrey Sterrett
(74) *Attorney, Agent, or Firm*—Ostrolenk, Faber, Gerb & Soffen, LLP (57) ABSTRACT

A self-oscillation switching power supply apparatus of the ringing choke converter type comprises a transformer T including a primary winding N1, a secondary winding N2, and a feedback winding $N_B$; a switching transistor Q1 which oscillates in a self-oscillating fashion in response to a feedback signal from the feedback winding $N_B$ thereby turning on and off the current flowing through the primary winding; a rectifying and smoothing circuit connected to the secondary winding; an oscillation frequency control circuit including a control transistor Q3 for controlling a control signal input to the switching transistor Q1 thereby controlling the control transistor Q3 so as to extend the off-time in the self-oscillation period of the switching transistor Q1; and an oscillation frequency control disabling circuit for disabling the control of the control transistor Q3 in accordance with a remote signal.

18 Claims, 10 Drawing Sheets

WAITING STATE    Po

RCC POWER SUPPLY WITH REMOTE DISABLING OF OSCILLATION FREQUENCY CONTROL

BACKGROUND OF THE INVENTION

1. Field of the Invention

The present invention relates to a self-oscillation switching power supply apparatus.

2. Description of the Related Art

Figure 9:
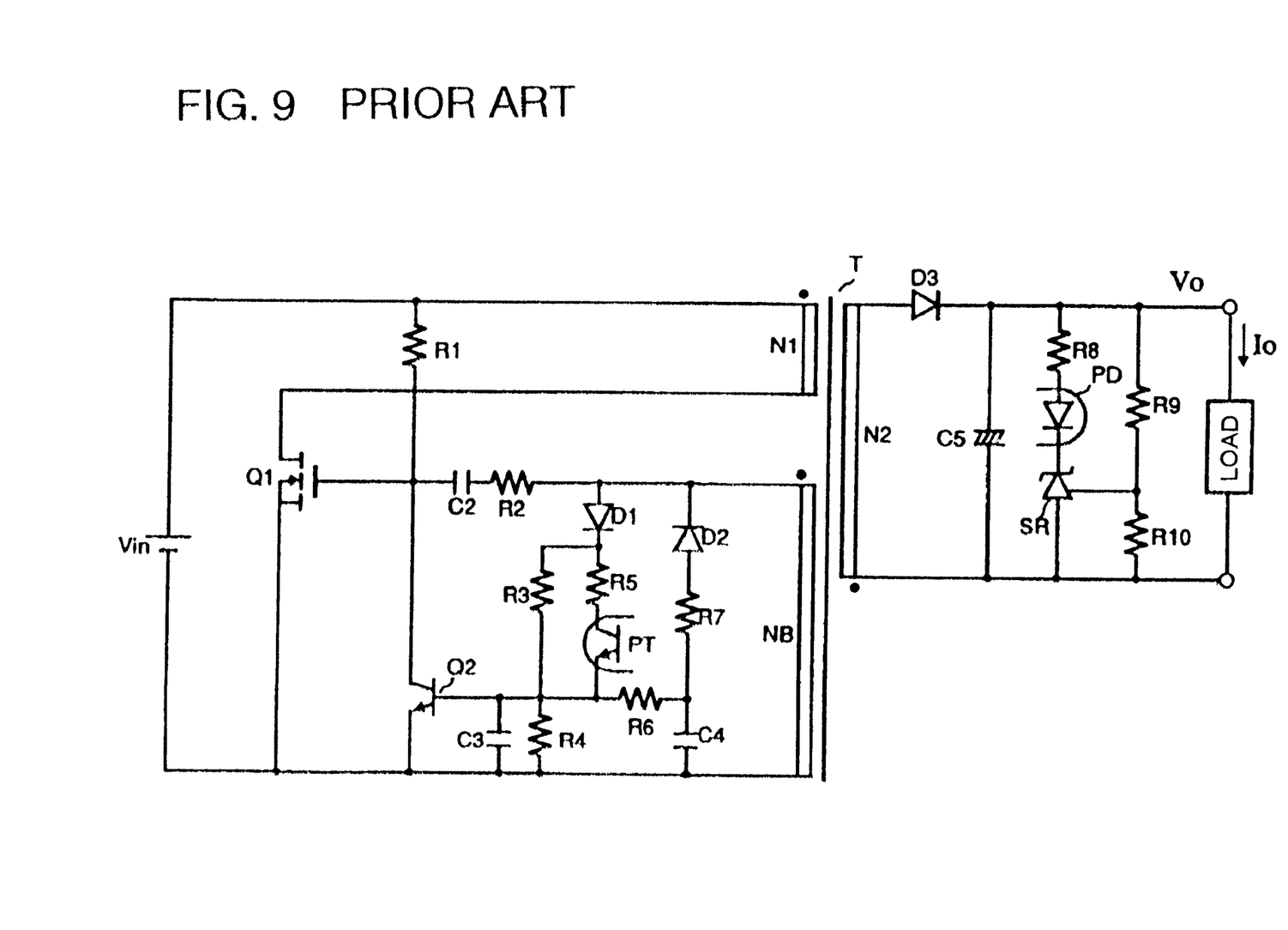
FIG. 9 is a circuit diagram of a self-oscillation switching power supply apparatus according to a conventional technique.

A ringing choke converter is widely used as a self-oscillation switching power supply apparatus. FIG. 9 is a circuit diagram of a ringing choke converter (hereinafter referred to as an RCC) according to a conventional technique. As shown in FIG. 9, a switching transistor Q1 is connected in series to a primary winding N1 of a transformer T. A control circuit including a phototransistor PT serving as a photosensing element of a photocoupler is connected to a feedback winding $N_B$ of the transformer. A control transistor Q2 is connected between the gate and the source of the switching transistor Q1.

A rectifying and smoothing circuit including a rectifying diode D3 and a smoothing capacitor C5 is disposed between two terminals of a secondary winding N2 of the transformer T. The output of this rectifying and smoothing circuit is connected to a voltage detecting circuit including a resistance voltage divider consisting of resistors R9 and R10, a shunt regulator SR, a light emitting diode PD of the photocoupler PC, and a resistor R8.

The circuit shown in FIG. 9 operates as follows. When the circuit is started by turning on a power supply, a voltage is applied to the gate of the switching transistor Q1 via the starting resistor R1 and the switching transistor Q1 turns on. As a result, an input power supply voltage is applied across the primary winding N1 of the transformer T and a voltage with the same polarity as that of the primary winding N1 is generated across the feedback winding $N_B$. This voltage signal is applied as a positive feedback signal to the gate of the switching transistor Q1 via a capacitor C2 and a resistor R2. Furthermore, the voltage induced across the feedback winding $N_B$ causes a charging current to flow into a capacitor C3 via a diode D1, resistors R3 and R5, and the phototransistor PT of the photocoupler. If the voltage across the capacitor C3 exceeds the forward base-emitter voltage of the control transistor Q2, the control transistor Q2 turns on. As a result, the gate-source voltage of the switching transistor Q1 becomes nearly 0 and thus the switching transistor Q1 is forced to turn off. As a result, a voltage is generated across the secondary winding of the transformer. This causes the rectifying diode D3 to have a voltage applied in the forward direction. As a result, the energy which has been stored in the transformer T during the on-period of Q1 is released via the secondary winding N2 and the capacitor C3 is reversely charged by a flyback voltage of the feedback winding $N_B$ via resistors R6 and R7 and a diode D2.

If the voltage across the capacitor C3 becomes lower than the forward base-emitter voltage of the control transistor Q2, the control transistor Q2 turns off and the energy stored in the transformer T is released from the secondary winding. If the current passing through the rectifying diode D3 becomes 0, a kick voltage is induced across the feedback winding $N_B$ whereby the switching transistor Q1 again turns on. After that, the above process is repeated.

In the above operation, the output voltage across the load is detected by means of a resistance divider comprising resistors R9 and R10 and the detected voltage is applied as a control voltage to the shunt regulator SR. According to the detected voltage, the shunt regulator SR changes the current passing through the light emitting diode PD of the photocoupler. As a result, a corresponding change occurs in the amount of light received by the phototransistor PT serving as the photosensing element of the photocoupler, and thus the impedance of the phototransistor PT changes. This causes a corresponding change in the charging time constant associated with the capacitor C3. Because the charging time constant increases with the reduction in the output voltage, a reduction in the output voltage results in an increase in the period of time from an off-to-on transition of the switching transistor Q1 to the following on-to-off transition forcedly brought about by the control transistor Q2, that is, an increase in the on-time of the switching transistor Q1, which results in an increase in the output voltage. As a result, the output voltage is controlled at a constant value.

Figure 10:
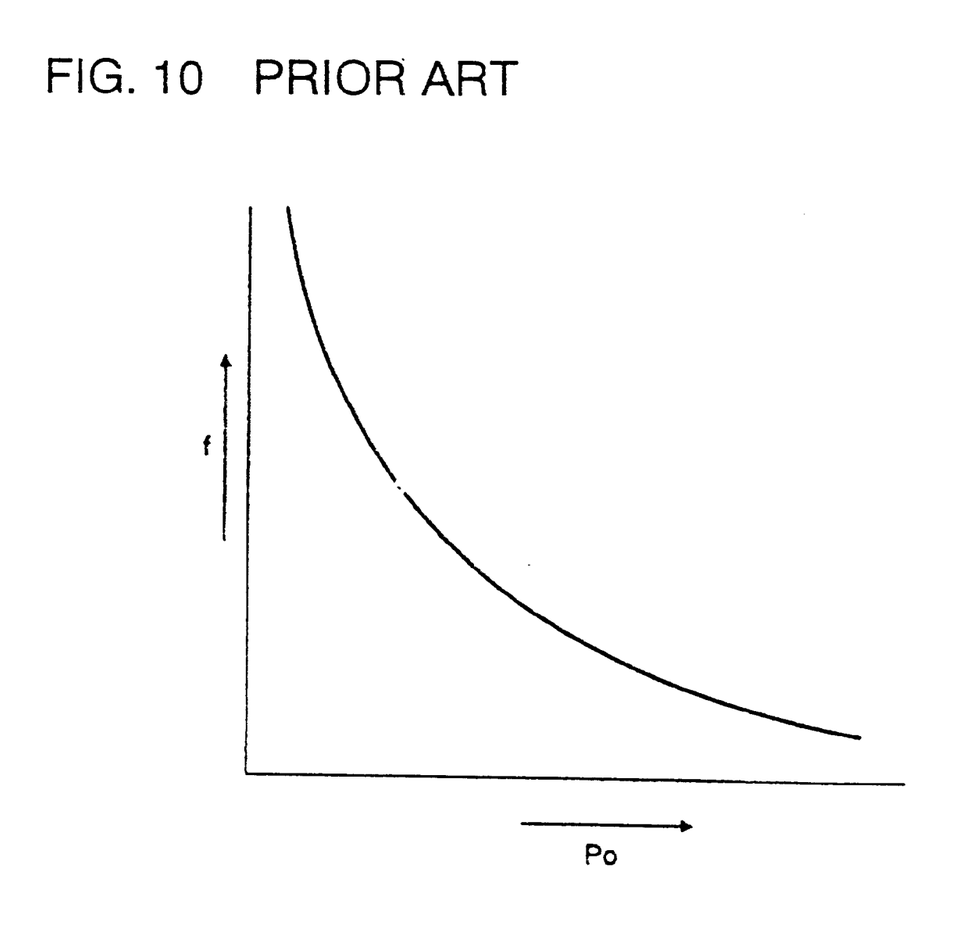
FIG. 10 is a graph illustrating the output power of the self-oscillation switching power supply apparatus according to the conventional technique as a function of frequency.

It is known that the oscillation frequency f of the switching transistor Q1 in the conventional self-oscillation switching power supply apparatus such as that shown in FIG. 9 varies in approximately inverse proportion to the input or output power as shown in FIG. 10 in which the oscillation frequency f is plotted as a function of the output power Po.

In general, the switching loss which occurs during each switching operation decreases with the reduction in the load. However, since the oscillation frequency f increases, as shown in FIG. 10, with the reduction in the output power Po and thus with the reduction in the load, the frequency of occurrence of switching loss per unit time increases with the increase in the oscillation frequency f. Therefore, the reduction in the switching loss which occurs when the load decreases is very small. This means that the efficiency of the power supply apparatus decreases with the reduction in the load.

The switching loss under low load condition can be reduced by designing the circuit parameters such that the oscillation frequency for the operation under the rated-load condition becomes low enough. However, in the case where the power supply apparatus is required to handle a load varying over a wide range from extremely low to high levels, it is necessary to set the oscillation frequency f under the low load condition to a relatively high value. That is, the oscillation frequency under the rated-load condition is generally determined by factors associated with components such as the magnetic flux density of the transformer and other factors such as ripples and noise. If the oscillation frequency is set to a too low value, problems such as saturation of the transformer occur.

In view of the foregoing, there is a need for a self-oscillation switching power supply apparatus capable of operating without a reduction in the efficiency due to an increase in the oscillation frequency under a low load condition even in the case where the output power to load varies over a relatively large range.

SUMMARY OF THE INVENTION

The present invention is directed to self-oscillation switching power supply apparatus that satisfied this need. The self-oscillation switching power supply apparatus is a ringing choke converter type and comprises: a transformer T including a primary winding N1, a secondary winding N2, and a feedback winding $N_B$; a switching transistor Q1 which oscillates in a self-oscillating fashion in response to a feedback signal from the feedback winding $N_B$ thereby turning on and off the current flowing through the primary winding; and a rectifying and smoothing circuit connected to said secondary winding. The self-oscillation switching power supply apparatus further comprises: an oscillation frequency control circuit including a control transistor Q3 for controlling a control signal input to the switching transistor Q1 thereby controlling the control transistor Q3 so as to extend the off-time in the self-oscillation period of the switching transistor Q1; and an oscillation frequency control disabling circuit for disabling the control of the control transistor Q3 in accordance with a remote signal.

In this self-oscillation switching power supply apparatus with the above-described circuit configuration, the oscillation frequency control circuit controls the control transistor Q3 thereby controlling the switching transistor Q1 so as to extend the off-time in the self-oscillation period of the switching transistor Q1. As a result, the switching frequency of the switching transistor Q1 becomes lower than would be if there were not provided the oscillation frequency control circuit. If a remote signal is received from the outside, the control of the control transistor Q3 is disabled and thus the self-oscillation switching power supply apparatus operates as a self-oscillation switching power supply apparatus of the normal RCC type. This allows the self-oscillation switching power supply apparatus to generate a power supply voltage for a wide range of loads.

The self-oscillation switching power supply apparatus may includes a starting circuit for supplying a starting signal to the control signal input of the switching transistor Q1; and a rectifying and smoothing circuit for rectifying and smoothing a voltage generated across the feedback winding $N_B$, the rectifying and smoothing circuit being disposed between the control signal input of the switching transistor Q1 and the feedback winding $N_B$.

According to the circuit configuration, a current supplied from both the starting circuit and the rectifying and smoothing circuit serves as a control signal for controlling the switching transistor. In response to this control signal applied to the switching transistor, the off-time of the switching transistor varies. Therefore, the rectifying and smoothing circuit causes an increase in the oscillation frequency.

In a waiting state, the switching frequency of the switching transistor Q1 is reduced by the above-described oscillation frequency control circuit. As a result, the power loss in the waiting state is reduced. However, if the switching frequency is reduced to a too low value in the audio-frequency range, the switching operation can cause audible noise. This problem can be avoided by providing the above-described rectifying and smoothing circuit. If the starting current from the starting circuit is increased, the off-time of the switching transistor becomes shorter and thus the oscillation frequency becomes higher. However, the increase in the current from the starting circuit results in an increase in the power loss due to the starting circuit because the current from the starting circuit always flows regardless of whether the apparatus is in the waiting state or not. This problem is avoided by providing the above-described rectifying and smoothing circuit. That is, it is possible to independently set the off-time of the switching transistor and the starting current flowing through the starting circuit.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

DETAILED DESCRIPTION OF EMBODIMENTS OF THE INVENTION

Hereinafter, the preferred embodiments of the present invention are explained in detail with reference to the drawings.

Figure 1:
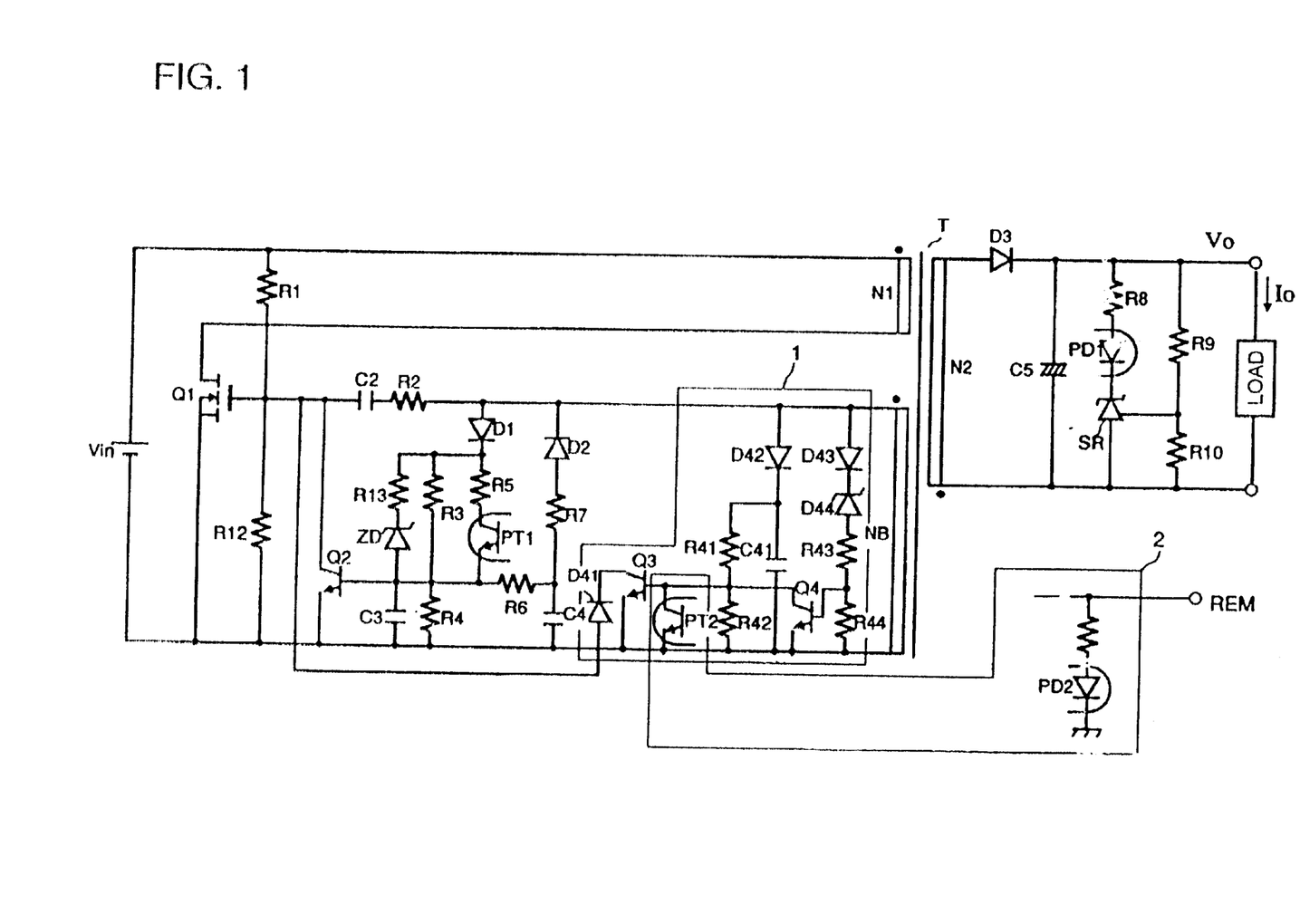
FIG. 1 is a circuit diagram of a self-oscillation switching power supply apparatus according to a first embodiment.

FIG. 1 is a circuit diagram of the self-oscillation switching power supply apparatus. As shown in FIG. 1, a MOS-FET serving as a switching transistor Q1 is connected to a primary winding N1 of a transformer T and there is provided a feedback circuit from a feedback winding $N_B$ of the transformer T to the switching transistor Q1. A rectifying and smoothing circuit including a rectifying diode D3 and a smoothing capacitor C5 is connected to a secondary winding N2 of the transformer T. The output of the rectifying and smoothing circuit is connected to a voltage detecting circuit including a resistance voltage divider consisting of resistors R9 and R10, a shunt regulator SR, a light emitting element PD1 of a first photocoupler, and a resistor R8.

In FIG. 1, when a remote signal REM with a high-level value is applied from the outside to a light emitting element PD2 of a second photocoupler, the light emitting element PD2 emits light and thus a phototransistor PT2 serving as a photosensing element of the second photocoupler turns on. A control transistor Q3 according to the present invention is connected, via a diode D41, between the gate and the source of the switching transistor Q1. In a steady state (non-waiting state), the above-described remote signal REM is at a high level. As a result, the control transistor Q3 is maintained in an off-state and the switching power apparatus operates as a self-oscillation switching power supply of the conventional RCC type. If the load varies into a waiting state (which can occur, for example, in an electronic device with a remote control unit, when the power supply of the main unit of the electronic device is turned off while maintaining electric power for the receiving circuit of the remote control unit)

and the remote signal REM varies to a low level, then the phototransistor PT2 of the second photocoupler turns off and the control transistor Q3 turns on and off in accordance with the circuit connected to the base of the control transistor Q3.

In FIG. 1, reference numeral 1 denotes a part corresponding to an oscillation frequency control circuit according to the invention and reference numeral 2 denotes a part corresponding to an oscillation frequency control disabling circuit according to the invention.

Figure 3A:
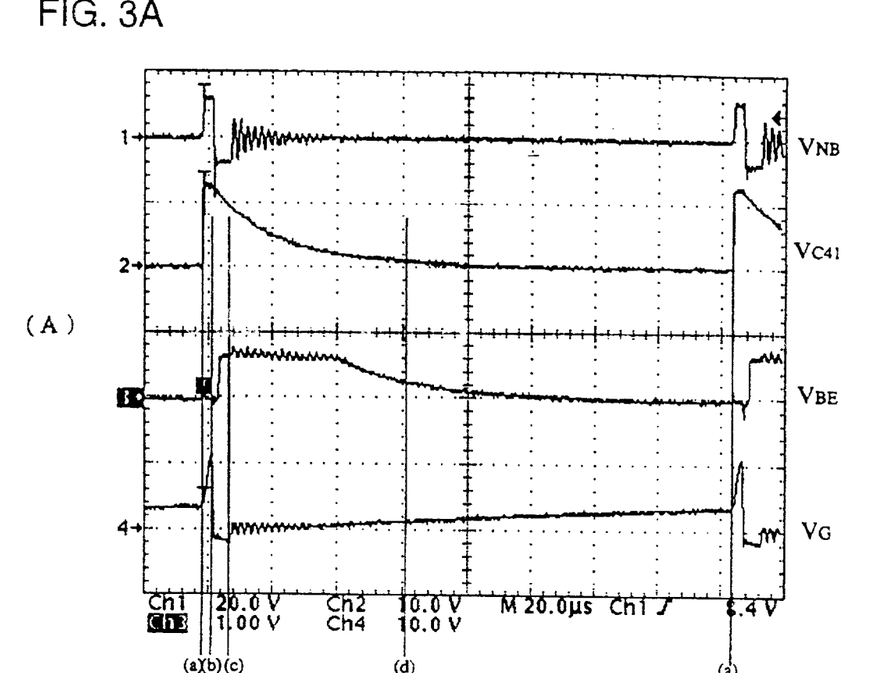
FIG. 3A is a graph illustrating waveforms at various points of the self-oscillation switching power supply apparatus according to the first embodiment.
Figure 3B:
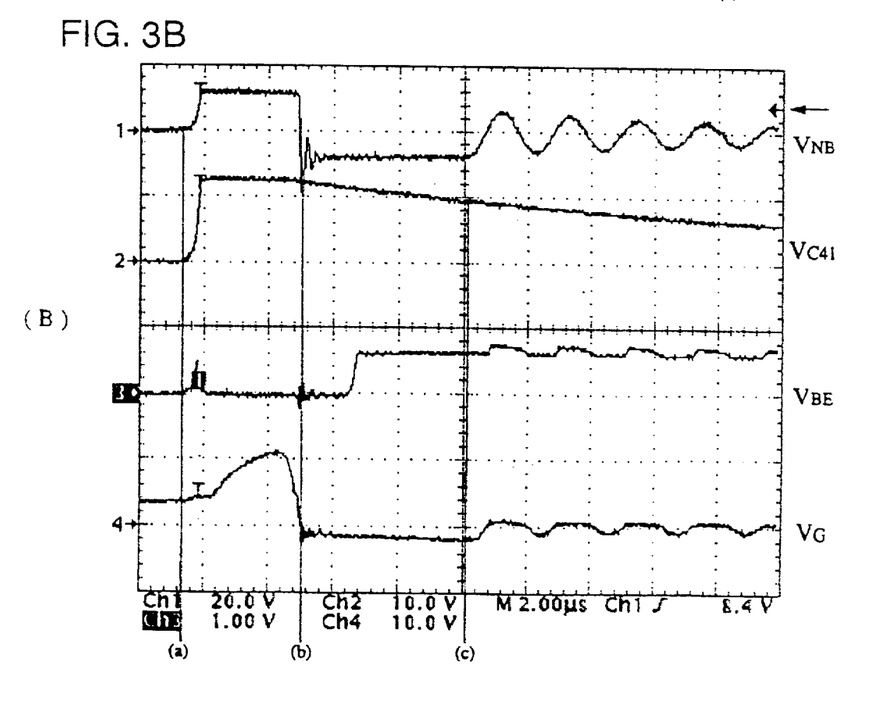
FIG. 3B is an enlarged graph thereof.
Figure 4A:
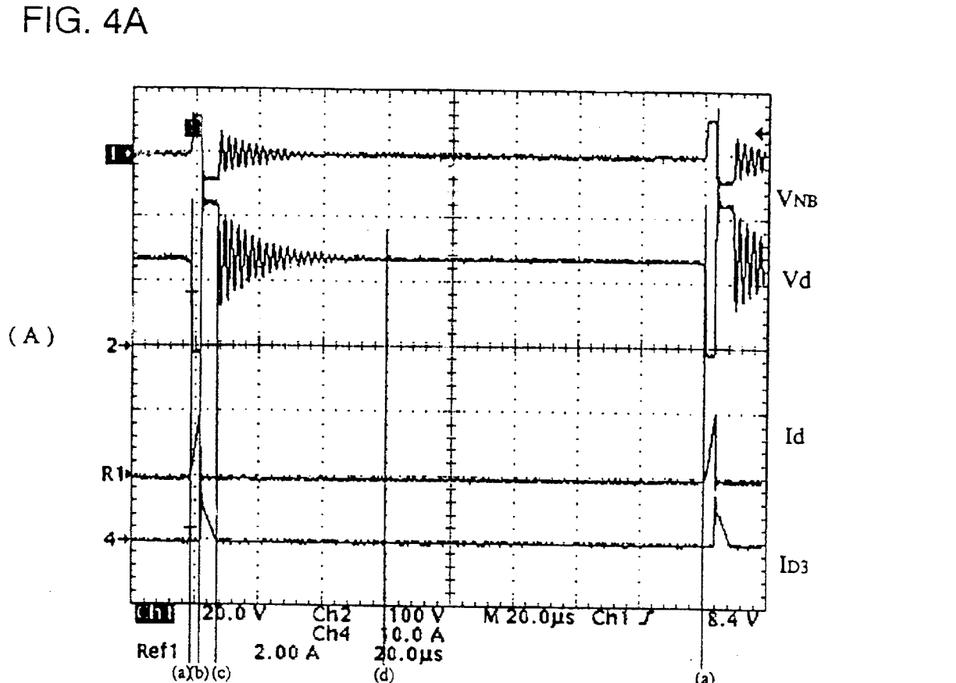
FIG. 4A is a graph illustrating waveforms at various points of the self-oscillation switching power supply apparatus according to the first embodiment.
Figure 4B:
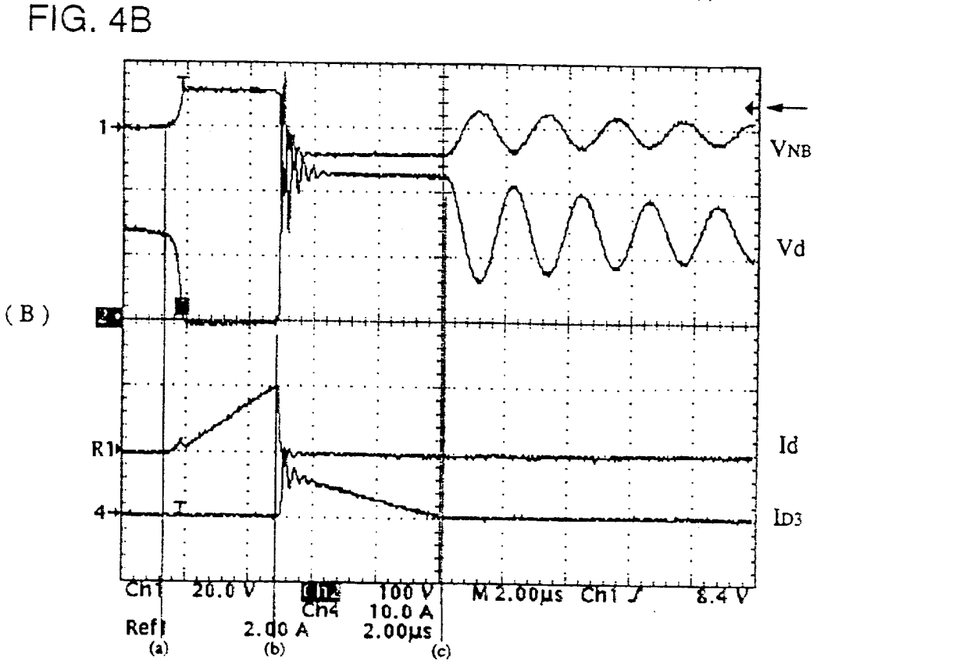
FIG. 4B is an enlarged graph thereof.

Referring now to FIGS. 3A, 3B, 4A and 4B, the operation in the waiting state is described below for each phase of the operation. FIGS. 3A and 4A illustrate voltage waveforms at various points in FIG. 1. In these figures, $V_{NB}$ denotes the voltage across the feedback winding $N_B$, Vc41 denotes the voltage across a capacitor C41, $V_{BE}$ denotes the base-emitter voltage of the control transistor Q3, $V_G$ denotes the gate-source voltage of the switching transistor Q1, Vd denotes the drain voltage of the switching transistor Q1, Id denotes the drain current of the switching transistor Q1, and $I_{D3}$ denotes the waveform of the current flowing through a rectifying diode D3 connected to the secondary winding. In these figures, the time axes of FIGS. 3B and 4B are expanded by a factor of 10 with respect to those of FIGS. 3A and 4A, respectively. The operations at times denoted by (a)–(d) in FIGS. 3 and 4 are described below.

(a) First, if an input power voltage Vin is applied, the gate voltage of transistor Q1 increases at a speed with a time constant determined by resistances R1 and R12 and the input capacitance between the gate and the source of the switching transistor Q1. When the gate voltage reaches a threshold voltage, Q1 turns on and a voltage is induced across the feedback winding $N_B$. As a result, the capacitor C41 is charged via a diode D42 and the base voltage of the control transistor Q3 increases. Herein, the voltage induced across the feedback winding $N_B$ is set to become higher than the Zener voltage of the Zener diode D44. More specifically, the voltage is set such that $V_{NB} \geq V_F + V_Z + (1+R43/R44)Vbe$ where $V_F$ is the forward voltage drop of the diode D43, $V_Z$ is the Zener voltage of the Zener diode D44, and Vbe is the base-emitter voltage required to turn on the transistor Q4. Thus, the transistor Q4 turns on before the control transistor Q3 turns on. As a result, the base voltage of transistor Q3 becomes zero and transistor Q3 remains in the off-state. A voltage indicated by an arrow in FIG. 3B denotes the Zener voltage of the Zener diode D44 (more exactly, the voltage is equal to the sum of the Zener voltage of the Zener diode D33 and the forward voltage of the diode D44).

(b) After that, if a time determined by a feedback signal given via the first photocoupler has elapsed, the switching transistor Q1 turns off. As a result, the base voltage of the transistor Q4 decreases and transistor Q4 turns off. In response, the charge stored in the capacitor C41 flows into the base of the control transistor Q3 via the resistor R41, and thus transistor Q3 turns on.

(c) If the secondary current of the transformer T becomes 0, the voltage across the feedback winding $N_B$ starts to oscillate. However, because the voltage does not exceed the Zener voltage of the Zener diode D44 as shown in FIG. 3B (more exactly, $V_{NB} < V_F + V_Z + (1+R43/R44)Vbe$), the transistor Q4 remains in the off-state 30 and the control transistor Q3 remains in the on-state. Therefore, the switching transistor Q1 does not turn on at the time at which the switching transistor Q1 would turn on in the normal RCC mode. That is, the off-time is extended.

(d) The charge stored in the capacitor C41 is released via the resistors R41 and R42. With reduction in the voltage across the capacitor 41, the base voltage of the control transistor Q3 decreases. When the base voltage of the control transistor Q3 becomes lower than the forward base-emitter voltage, transistor Q3 turns off.

However, the switching transistor Q1 does not turn on immediately after the turning-off of the control transistor Q3, but the switching transistor Q1 turns on when the gate voltage of the switching transistor Q1 reaches the threshold voltage after increasing at a speed with a time constant determined by the resistances R1 and R12 and the input capacitance between the gate and the source of transistor Q1. Thus the state returns to that described in (a). After that, the processes (a)–(d) are repeated.

As described above, when the remote signal applied from the outside is a signal indicating a waiting state, the off-time of the self-oscillation period of the switching transistor Q1 is extended and thus the oscillation frequency f becomes low.

If the remote signal changes to a signal indicating a steady state (non-waiting state), the phototransistor PT2 turns on and the control transistor Q3 is maintained in the off-state as described earlier. In this case, the oscillation frequency control circuit 1, which extends the off-time in the self-oscillation period of the switching transistor Q1, is disabled and thus the switching power supply apparatus operates as a normal RCC type self-oscillation switching power supply apparatus. When the control transistor Q3 is maintained in the off-state, the switching transistor Q1 is turned on by a kick voltage which is generated when the rectifying diode D3 connected to the secondary winding of the transformer T cuts off and the current becomes 0. That is, the switching transistor Q1 turns on at a time denoted by (c) in FIG. 3 and thus oscillation occurs at a high frequency.

Figure 2:
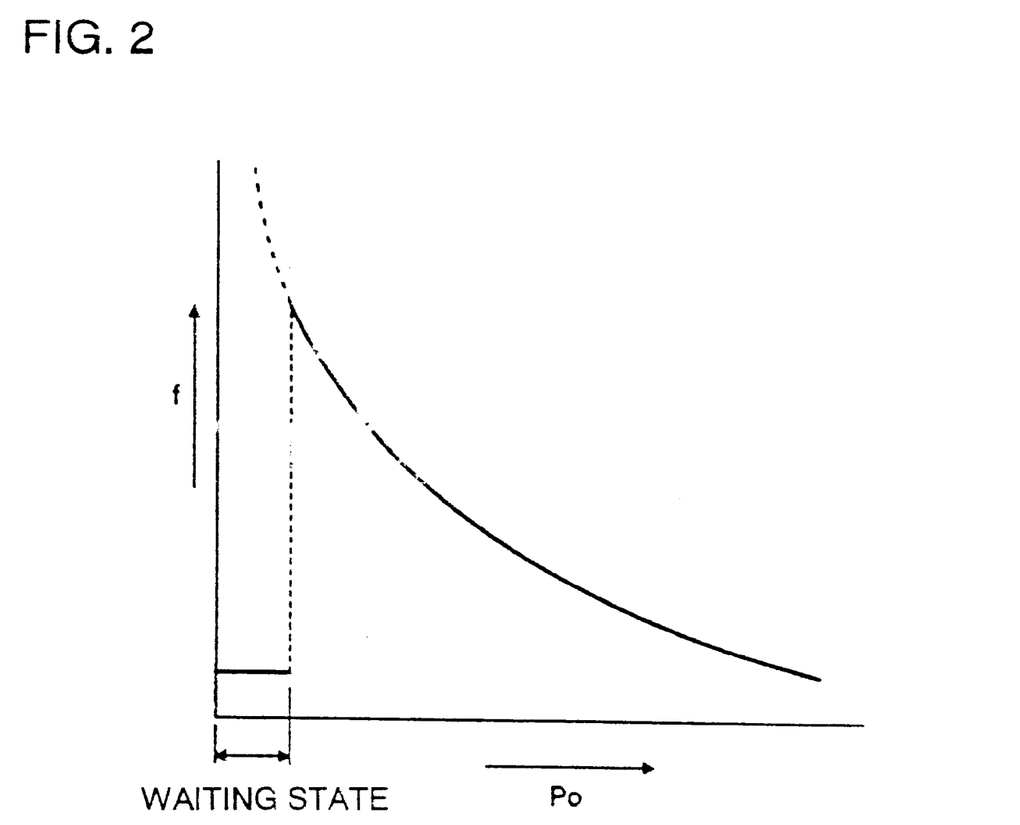
FIG. 2 is a graph illustrating the output power of the self-oscillation switching power supply apparatus according to the first embodiment as a function of frequency.

FIG. 2 illustrates the relationship between the output power of the above-described power supply apparatus and the oscillation frequency. In the waiting state, as can be seen from FIG. 2, the oscillation frequency is forced to a low value so that the switching loss is maintained at a low level. On the other hand, in the non-waiting state, the oscillation frequency decreases with the increase in the load so that the power supply apparatus can have a high current capacity when the load becomes large.

In the example shown in FIG. 1, unlike that shown in FIG. 9, a series circuit consisting of the resistor 13 and the Zener diode ZD is connected in parallel to the resistor R3. The effect of this circuit configuration is that the charging time constant associated with the capacitor C3 decreases with the increase in the input power voltage Vin. This makes the critical point associated with the overcurrent protection insensitive to Vin.

Figure 5:
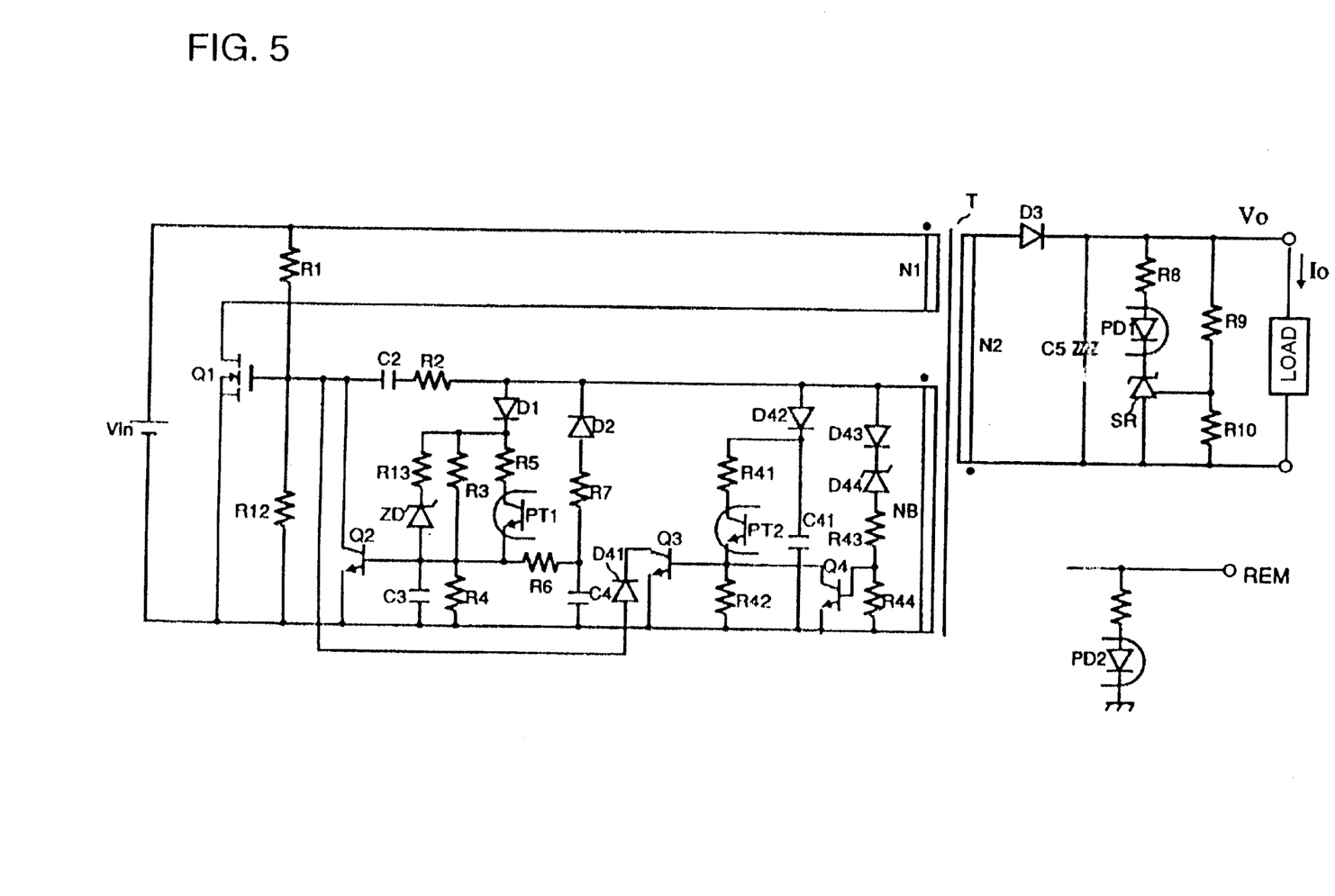
FIG. 5 is a circuit diagram of a self-oscillation switching power supply apparatus according to a second embodiment.

FIG. 5 is a circuit diagram of a self-oscillation switching power supply apparatus according to a second embodiment. This circuit is different from that shown in FIG. 1 in terms of the location of the phototransistor PT2 serving as the photosensing element, for receiving the remote signal, of the second photocoupler. That is, in this second embodiment, PT2 is connected in series to the resistor R41. In this circuit configuration, when PT2 turns on and off, the resistance division ratio associated with the resistors R41 and R42 and the phototransistor PT2 changes in an opposite fashion to FIG. 1. That is, when PT2 is in an on-state, the control transistor Q3 periodically turns on and off while the control transistor Q3 is maintained in an off-state when PT2 is in an off-state.

Figure 6:
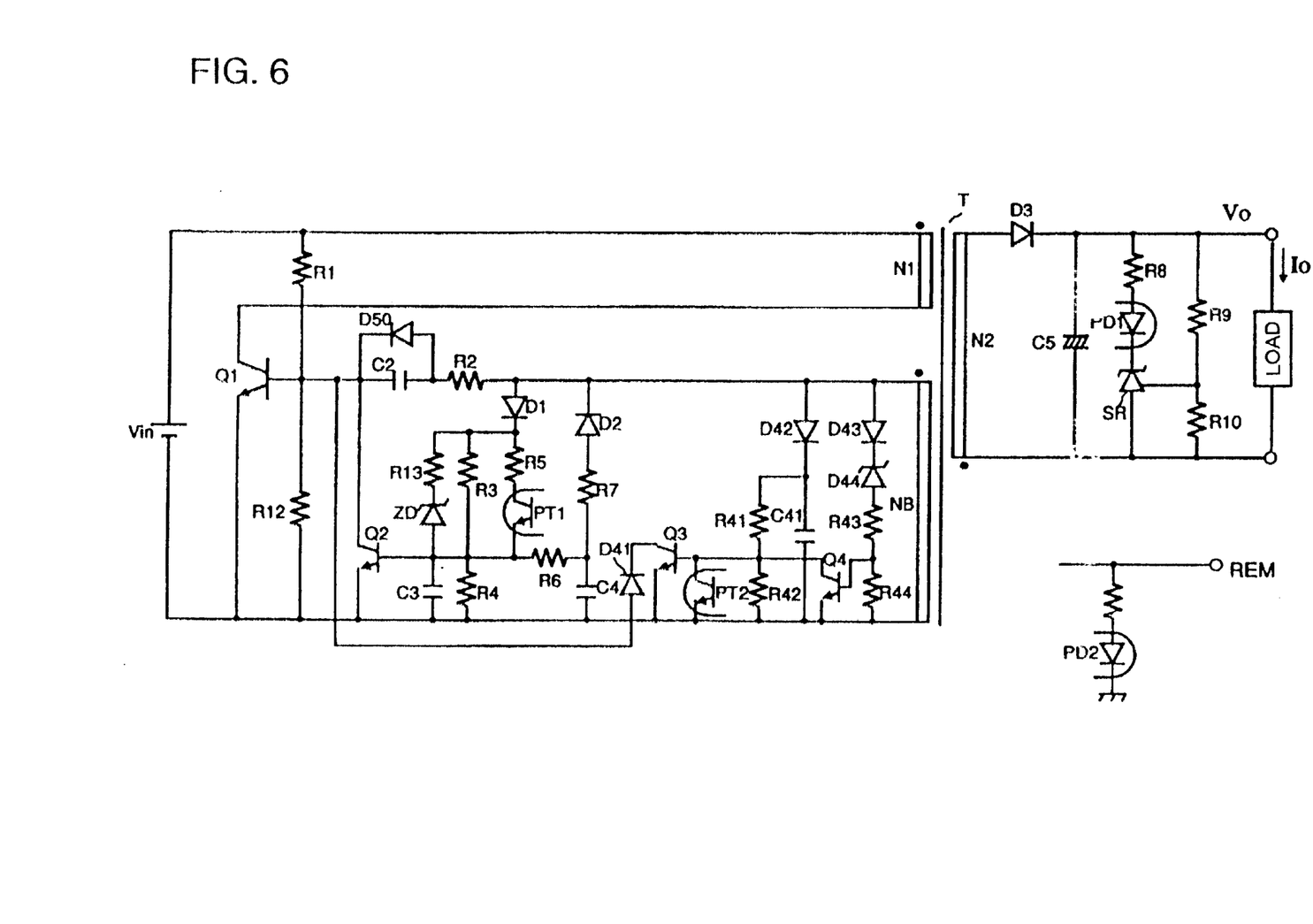
FIG. 6 is a circuit diagram of a self-oscillation switching power supply apparatus according to a third embodiment.

FIG. 6 is a circuit diagram of a self-oscillation switching power supply apparatus according to a third embodiment. In this third embodiment, the switching transistor Q1 in the circuit shown in FIG. 1 is replaced with a bipolar transistor. Furthermore, an additional diode D50 is provided in the feedback path from the feedback winding $N_B$ to the base of the switching transistor Q1. In this circuit configuration, a current signal is positively fed back from the feedback winding $N_B$ to the base of the switching transistor Q1. Except for this point, the circuit operates in the same manner as the first embodiment.

Figure 7:
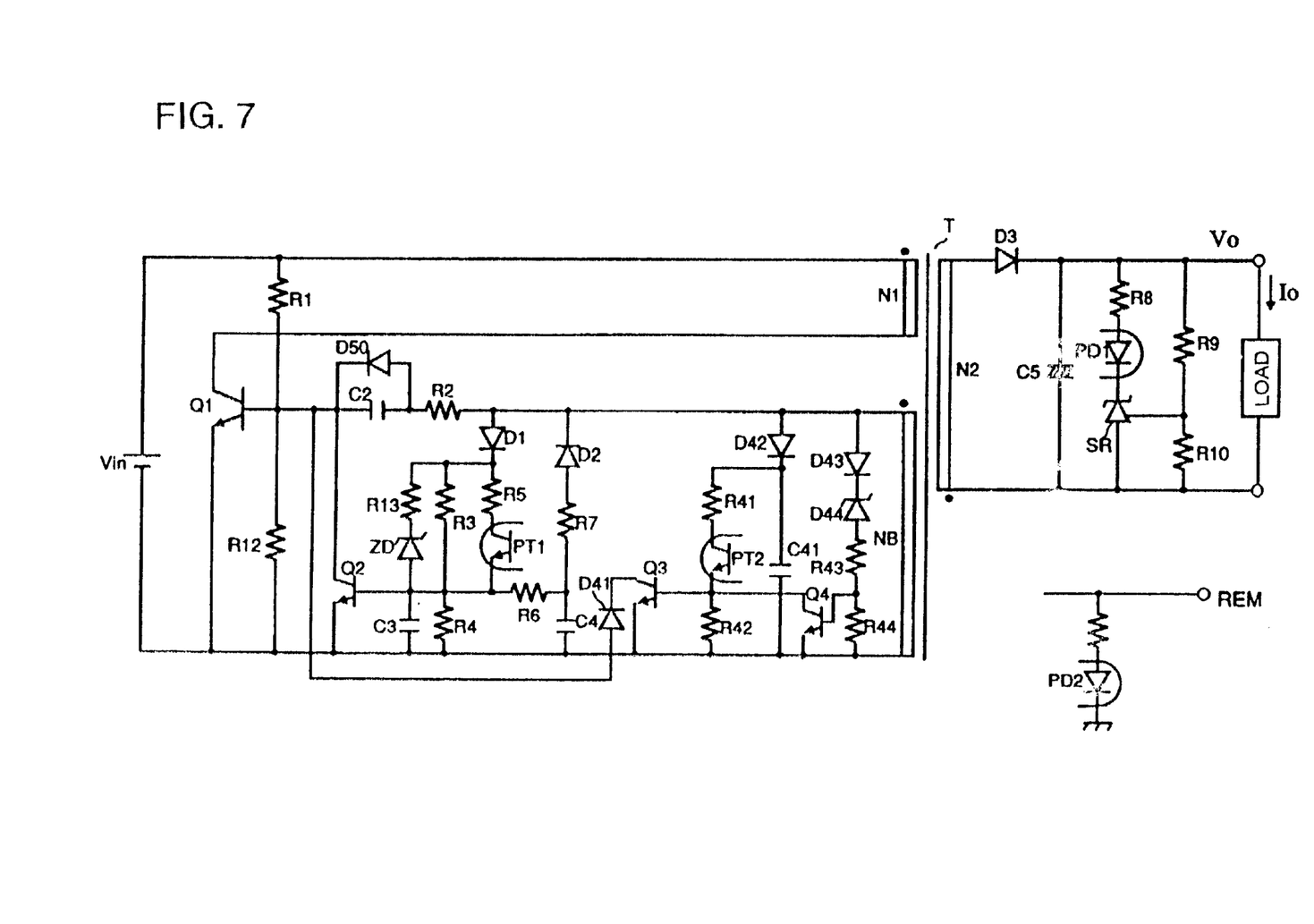
FIG. 7 is a circuit diagram of a self-oscillation switching power supply apparatus according to a fourth embodiment.

FIG. 7 is a circuit diagram of a self-oscillation switching power supply apparatus according to a fourth embodiment. In this fourth embodiment, the switching transistor Q1 in the circuit shown in FIG. 5 is replaced with a bipolar transistor. The general operation of this circuit is similar to the circuit according to the second embodiment.

When a bipolar transistor is employed as the switching transistor, a small base driving current is required in the waiting state and thus it is possible to further reduce the power loss in the waiting state. On the other hand, when a MOS-FET is employed as the switching transistor, its low on-resistance results in a reduction in the power loss in the steady state (non-waiting state).

Figure 8:
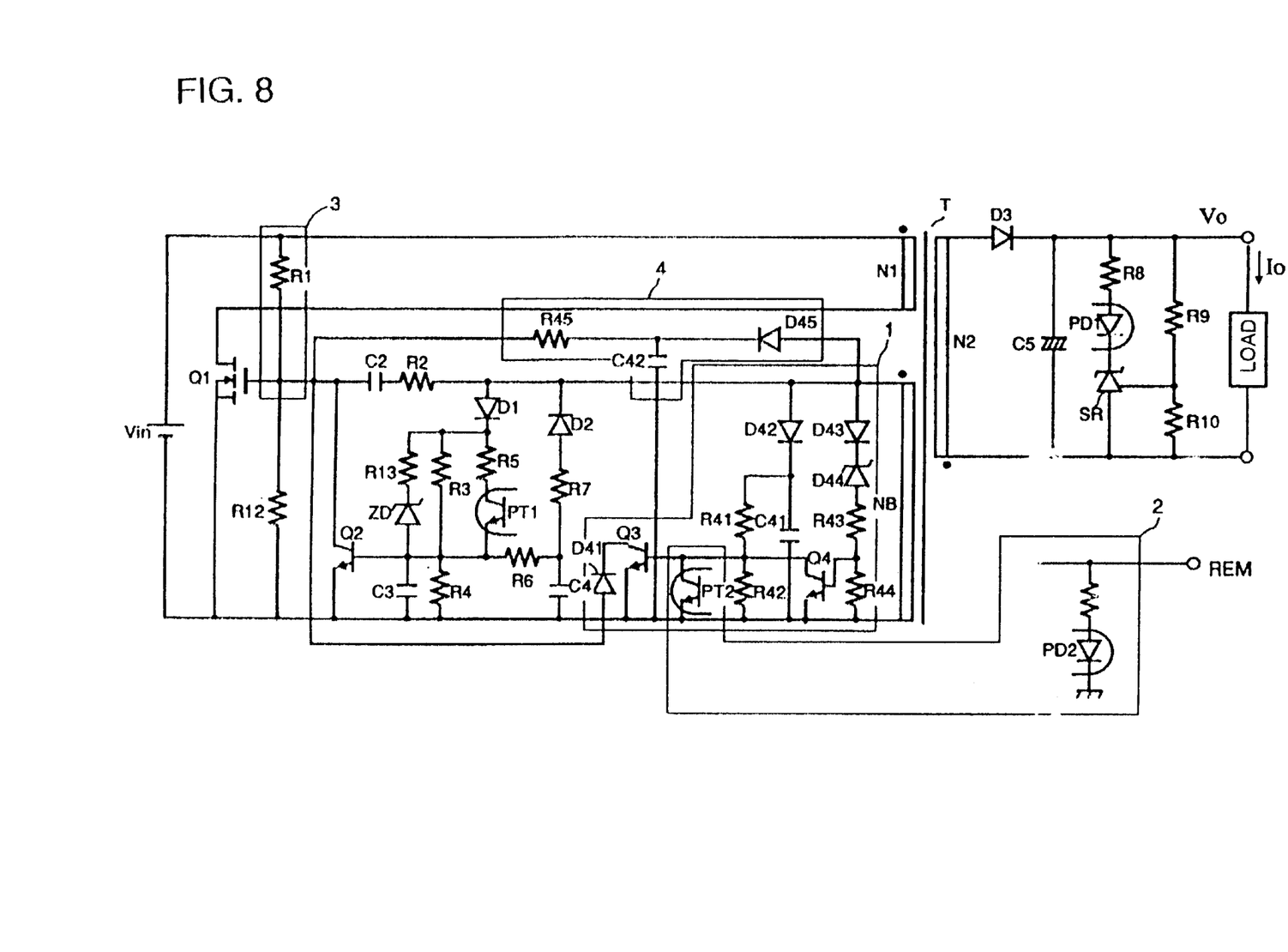
FIG. 8 is a circuit diagram of a self-oscillation switching power supply apparatus according to a fifth embodiment.

FIG. 8 is a circuit diagram of a self-oscillation switching power supply apparatus according to a fifth embodiment. The circuit according to this fifth embodiment is equivalent to a circuit obtained by adding a rectifying and smoothing circuit 4 to the circuit shown in FIG. 1. In FIG. 8, reference numeral 4 denotes a rectifying and smoothing circuit including a diode D45 for rectifying a voltage generated across the feedback winding $N_B$, a capacitor C42 for smoothing the rectified voltage, and a resistor R45 through which the smoothed voltage is applied to the gate of the switching transistor Q1. Reference numeral 3 denotes a starting circuit including a starting resistor R1 through which a starting current is supplied to the gate of the switching transistor Q1. The other parts in FIG. 8 are similar to those in FIG. 1.

In FIG. 8, the capacitor C42 is charged by a voltage generated across the feedback winding $N_B$ during the on-period of the switching transistor Q1. During the off-period of the switching transistor Q1, the charge stored in the capacitor C42 flows as a current into the resistor R12 via the resistor R45 and also as a charging current to the gate-source capacitance of the switching transistor Q1. A part of the current flowing into the resistor R12 is also supplied via the starting resistor R1 and a part of the charging current into the gate-source capacitance of the switching transistor Q1 is also supplied via the starting resistor R1. That is, the current flowing into the gate-source capacitance of the switching transistor Q1 is given as the sum of the current supplied from the rectifying and smoothing circuit 4 and the current supplied from the starting circuit 3.

Because the off-period of the switching transistor decreases with the increase in the current (control signal) to the gate of this switching transistor, the oscillation frequency can be increased by the rectifying and smoothing circuit 4.

In the waiting state, the power loss can be reduced by reducing the switching frequency of the switching transistor Q1 by means of the oscillation frequency control circuit 1. Furthermore, the oscillation frequency control circuit 1 prevents the switching frequency from decreasing down to a too low value in the audio-frequency range. Because it is not required to increase the staring current from the starting circuit to increase the oscillation frequency, the current from the starting circuit can be set to a minimum required value so that the power loss associated with the starting circuit is minimized.

The rectifying and smoothing circuit 4 may also be added to the circuits shown in FIGS. 5, 6, and 7 so as to achieve similar effects.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A self-oscillation switching power supply apparatus of the ringing choke converter type comprising:
   a transformer including a primary winding, a secondary winding, and a feedback winding;
   a switching transistor which oscillates with a self-oscillation period so as to have an on-time and an off time in response to a feedback signal from said feedback winding thereby turning on and off current flowing through said primary winding;
   a rectifying and smoothing circuit connected to said secondary winding;
   an oscillation frequency control circuit including a control transistor for controlling a control signal input to said switching transistor and a capacitor to be charged by a voltage induced across said feedback winding, the oscillation frequency control circuit controlling said control transistor in response to discharge of the capacitor so as to extend the off-time in the self-oscillation period of said switching transistor; and
   an oscillation frequency control disabling circuit for disabling the control of said control transistor in accordance with a remote signal.

2. The self-oscillation switching power supply apparatus of claim 1, further comprising:
   a starting circuit for supplying a starting signal to the control signal input of said switching transistor; and
   a second rectifying and smoothing circuit for rectifying and smoothing a voltage generated across said feedback winding, said second rectifying and smoothing circuit being disposed between the control signal input of said switching transistor and said feedback winding.

3. The self-oscillation switching power supply apparatus of claim 2, wherein the second rectifying and smoothing circuit comprises a rectifier diode, a filter capacitor and a resistor coupled to the control input of the switching transistor.

4. The self-oscillation switching power supply apparatus of claim 1, wherein the oscillation frequency control circuit includes a further control transistor having an output coupled to a control input of the control transistor, the further control transistor having a control input coupled to the feedback winding whereby when the oscillation frequency control disabling circuit does not disable the control of said control transistor by maintaining said control transistor in an off-state, the further control transistor controls a duration of an on-state of the control transistor thereby to extend the off-state of the switching transistor.

5. The self-oscillation switching power supply apparatus of claim 4, further comprising a voltage threshold circuit comprising a voltage divider coupled in series with a zener diode and a diode across said feedback winding, the voltage divider having a divider output coupled to the control input of the further control transistor.

6. The self-oscillation switching power supply apparatus of claim 1, further comprising a starting circuit for initially providing a control current to said switching transistor on start-up.

7. The self-oscillation switching power supply apparatus of claim 1, further comprising a switching control transistor for controlling the on-state and off-state of said switching transistor in response to a signal from the feedback winding and a signal proportional to a voltage from said secondary winding.

8. The self-oscillation switching power supply apparatus of claim 7, wherein the signal from the feedback winding is a positive feedback signal to turn said switching transistor to the on-state and after a time delay the switching transistor turns to the off-state, said signal proportional to a voltage from the secondary winding regulating the output voltage level from said secondary winding by controlling said switching control transistor.

9. The self-oscillation switching power supply apparatus of claim 7, further comprising a series circuit comprising a resistor and a zener diode coupled to the control input of said switching control transistor thereby changing a charging time constant so that the charging time constant decreases with input voltage supplied to the self-oscillation switching power supply apparatus.

10. The self-oscillation switching power supply apparatus of claim 1, wherein the oscillation frequency control disabling circuit comprises a photo coupler for coupling the remote signal.

11. A method of controlling a self-oscillation switching power supply apparatus of the ringing choke converter type wherein the switching power supply has a transformer including a primary winding, a secondary winding, and a feedback winding; a switching transistor which oscillates with a self-oscillation period so as to have an on-time and an off-time in response to a feedback signal from said feedback winding thereby turning on and off current flowing through said primary winding; and a rectifying and smoothing circuit connected to said secondary winding; the method comprising steps of:

providing a further control of said switching transistor by providing a control signal to a control input of said switching transistor from an oscillation frequency control circuit including a capacitor to be charged by a voltage induced across said feedback winding;

controlling the control signal input to said switching transistor in response to discharge of said capacitor so as to extend the off-time in the self-oscillation period of said switching transistor; and selectively disabling the further control in accordance with a remote signal.

12. The method of claim 11, wherein the step of controlling comprises: controlling a control transistor so as to extend the off-time in the self oscillation period of the switching transistor in response to a feedback signal from the feedback winding and the step of selectively disabling comprises providing the remote signal to the control transistor to disable said control transistor whereby the off-time in the self-oscillation period of the switching transistor is selectively not extended.

13. The method of claim 12, further comprising changing a charging time constant of a time constant circuit coupled to the control transistor so that the charging time constant decreases with input voltage supplied to the self-oscillation switching power supply apparatus.

14. The method of claim 12, further comprising providing a further control transistor having an output coupled to a control input of the control transistor, the further control transistor having a control input coupled to the feedback winding whereby when the control of said control transistor is not disabled by maintaining said control transistor in an off-state, the further control transistor controls a duration of an on-state of the control transistor thereby to extend the off-state of the switching transistor.

15. The method of claim 14, further comprising controlling the further control transistor and providing a voltage threshold circuit coupled to said further control transistor and to said feedback winding, whereby when said switching transistor is in an on-state, said feedback winding produces a feedback voltage above a voltage threshold of said threshold circuit thereby turning on said further control transistor and maintaining said control transistor in an off-state so as not to affect the on-time of said switching transistor and when said switching transistor is in an off-state said feedback winding produces an oscillating voltage that does not exceed said threshold, turning off said further control transistor and allowing the control transistor to turn on, thereby extending the off-time of said switching transistor.

16. The method of claim 11, further comprising providing a switching control transistor for controlling the on-state and off-state of said switching transistor in response to a signal from the feedback winding and a signal proportional to a voltage from said secondary winding.

17. The method of claim 16, wherein the signal from the feedback winding is a positive feedback signal to turn said switching transistor to the on-state and after a time delay the switching transistor turns to the off-state, said signal proportional to a voltage from the secondary winding regulating the output voltage level from said secondary winding by controlling said switching control transistor.

18. The method of claim 11 further comprising:

supplying a starting signal to the control signal input of said switching transistor; and rectifying and smoothing a voltage generated across said feedback winding and providing a rectified and smoothed voltage from the feedback winding to the control signal input of said switching transistor thereby to decrease the off-time of the switching transistor and increase switching frequency.

* * * * *